(12) United States Patent
Vartak et al.

(10) Patent No.: US 10,635,083 B2
(45) Date of Patent: Apr. 28, 2020

(54) APPARATUS AND METHOD FOR GENERATING SMART VISUALIZATIONS FOR EFFECTIVE MONITORING AND CONTROL IN INDUSTRIAL PROCESS CONTROL AND AUTOMATION SYSTEMS

(71) Applicant: Honeywell International Inc., Morris Plains, NJ (US)

(72) Inventors: Mandar Vartak, Bangalore (IN); Sanjay K. Dave, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 63 days.

(21) Appl. No.: 15/977,086

(22) Filed: May 11, 2018

(65) Prior Publication Data
US 2019/0011899 A1    Jan. 10, 2019

Related U.S. Application Data

(60) Provisional application No. 62/530,377, filed on Jul. 10, 2017.

(51) Int. Cl.
*G06T 11/20* (2006.01)
*G05B 19/409* (2006.01)
*G05B 23/02* (2006.01)

(52) U.S. Cl.
CPC ....... *G05B 19/409* (2013.01); *G05B 23/0272* (2013.01); *G05B 2219/31318* (2013.01); *G05B 2219/32128* (2013.01)

(58) Field of Classification Search
CPC ...... G06T 11/206; G06T 11/20; G06F 3/0481; G06F 17/246; H04L 41/22
USPC .......................................................... 345/440
See application file for complete search history.

(56) References Cited

U.S. PATENT DOCUMENTS

| | | | |
|---|---|---|---|
| 4,675,147 A * | 6/1987 | Schaefer | G21D 3/04 345/440 |
| 7,336,278 B2 * | 2/2008 | Brooks | G05B 19/41875 345/440 |
| 2005/0093866 A1 | 5/2005 | Ebert | |
| 2013/0325158 A1 | 12/2013 | Kobayashi et al. | |

* cited by examiner

*Primary Examiner* — Gordon G Liu (57) ABSTRACT

A method includes obtaining parameter values for multiple process variables associated with at least one industrial process, where the parameter values for each process variable include low and high limits and a current value. The method also includes presenting a graphical display that includes radial lines each associated with a different one of the process variables, a first graphical indicator passing through the radial lines and identifying the low limits of the process variables, a second graphical indicator passing through the radial lines and identifying the high limits of the process variables, and third graphical indicators identifying the current values of the process variables along the radial lines.

17 Claims, 6 Drawing Sheets

APPARATUS AND METHOD FOR GENERATING SMART VISUALIZATIONS FOR EFFECTIVE MONITORING AND CONTROL IN INDUSTRIAL PROCESS CONTROL AND AUTOMATION SYSTEMS

CROSS-REFERENCE TO RELATED APPLICATION AND PRIORITY CLAIM

This application claims priority under 35 U.S.C. § 119(e) to U.S. Provisional Patent Application No. 62/530,377 filed on Jul. 10, 2017. This provisional application is hereby incorporated by reference in its entirety.

TECHNICAL FIELD

This disclosure generally relates to industrial process control and automation systems. More specifically, this disclosure relates to an apparatus and method for generating smart visualizations for effective monitoring and control in industrial process control and automation systems.

BACKGROUND

Industrial process control and automation systems are often used to automate large and complex industrial processes. In conventional control and automation systems, industrial process controllers receive measurements from sensors and generate control signals for actuators. Some of these controllers can implement model predictive control (MPC) or other forms of advanced process control (APC).

Advanced process control is used in various industries, such as to drive complex systems so that the systems operate at or near their limits and deliver operational performance and economic benefits to customers. Sustaining the performance of APC process controllers over time can be useful or important for realizing the benefits that these applications promise. As a result, APC monitoring by human operators is often needed in order to maintain an industrial process (or a portion thereof) at optimum conditions.

SUMMARY

This disclosure provides an apparatus and method for generating smart visualizations for effective monitoring and control in industrial process control and automation systems.

In a first embodiment, a method includes obtaining parameter values for multiple process variables associated with at least one industrial process, where the parameter values for each process variable include low and high limits and a current value. The method also includes presenting a graphical display. The graphical display includes radial lines each associated with a different one of the process variables, a first graphical indicator passing through the radial lines and identifying the low limits of the process variables, a second graphical indicator passing through the radial lines and identifying the high limits of the process variables, and third graphical indicators identifying the current values of the process variables along the radial lines.

In a second embodiment, an apparatus includes at least one processing device configured to obtain parameter values for multiple process variables associated with at least one industrial process, where the parameter values for each process variable include low and high limits and a current value. The at least one processing device is also configured to generate a graphical display. The graphical display includes radial lines each associated with a different one of the process variables, a first graphical indicator passing through the radial lines and identifying the low limits of the process variables, a second graphical indicator passing through the radial lines and identifying the high limits of the process variables, and third graphical indicators identifying the current values of the process variables along the radial lines.

In a third embodiment, a non-transitory computer readable medium contains instructions that when executed cause at least one processing device to obtain parameter values for multiple process variables associated with at least one industrial process, where the parameter values for each process variable include low and high limits and a current value. The medium also contains instructions that when executed cause the at least one processing device to generate a graphical display. The graphical display includes radial lines each associated with a different one of the process variables, a first graphical indicator passing through the radial lines and identifying the low limits of the process variables, a second graphical indicator passing through the radial lines and identifying the high limits of the process variables, and third graphical indicators identifying the current values of the process variables along the radial lines.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, advanced process control (APC) is used in various industries, such as to drive complex systems so that the systems operate at or near their limits and deliver operational performance and economic benefits to customers. APC monitoring is often needed in order to sustain the performance of APC process controllers over time. However, there can be tens, hundreds, or thousands of process variables used by an APC controller and its associated optimizer. It can be very difficult for an operator to monitor such a large number of process variables in order to control the process variables and maintain the process variables within acceptable limits.

In many implementations, visualizations are used by operators to monitor industrial processes (or portions thereof) for which the operators are responsible. Visualizations can help operators to identify process variables to focus on, causes of deviations in the process variables, and sub-optimal conditions of the process variables. Various types of visualizations have been used to monitor process variables, such as plant graphics, faceplates, data grids, and trends. However, these visualizations typically do not "surface" an issue or issues that an operator needs to focus on immediately or in the near future. Instead, an operator often needs to sift through various visualizations to discover issues of importance. Since an operator may be involved in various tasks other than monitoring, it can be useful or desirable for visualizations to identify issues that the operator needs to know about.

Moreover, in the case of an APC controller and its associated optimizer, out of numerous process variables, there may be some key process variables that have external or user-defined optimization targets that are to be met. Operators, APC engineers, or other personnel may want to know how far those key process variables are deviating from their optimization targets and then drill down to visualize the causes of these sub-optimal conditions. This can be difficult to accomplish using standard visualizations.

In accordance with this disclosure, various forms of radar charts can be used to plot process variable parameters, which can be normalized across multiple process variables. Example types of parameters that could be plotted on a radar chart include a low limit, a high limit, a current value, and a steady-state value for each process variable. A process variable whose current value is outside of its low and high limits can be highlighted to attract an operator's attention. Also, plotting the steady-state value and the current value of a process variable can indicate to an operator where the current value of the process variable is likely to settle. In addition, it is often desirable to push certain process variables as close as possible to their high or low limits and keep those process variables there for the maximum time possible. For better visualization of such a desirable set of limits, markers may optionally be placed in locations of the radar charts where those desirable limits are located. This allows for easier identification of more efficient or profitable operations of equipment and for easier identification of deviations from those operations.

By designing the radar charts in this manner, the radar charts can help to surface issues and enable an operator to focus on issues that are likely to happen in the near future or that are happening now. In some cases, multiple related radar charts, such as a controlled variable (CV) radar plot and a manipulated variable (MV) radar plot, can be displayed side-by-side, which could help to provide a holistic view of an entire APC controller/optimizer. Also, a large number of process variables associated with a controller or optimizer could be subdivided into smaller logical groupings, and a radar chart could be used to display values of process variables in one or more selected logical groups. An operator could also switch between radar charts in order to view information about the process variables in different logical groups.

An operator can also perform drilldown on one or more deviating process variables from a radar chart, such as to obtain quick trends or other information about the deviating process variables. A quick trend is a visualization setup where key parameters of one or more deviating process variables are plotted against parameters of process variables that have a high impact gain relationship with the deviating variable(s). A high impact gain relationship refers to a relationship between process variables in which a change to one of the process variables results in a significant change to another of the process variables. In this view, the operator can quickly analyze possible reasons for variable deviations. There can be various reasons for deviations, and several reasons that could be interpreted from this view include (i) one or more constrained limits of one or more manipulated variables and (ii) one or more variables cycling around one or more limits. An operator can quickly take action to change limits or request an engineer's help for further investigation regarding tuning parameters or remodeling of relationships between variables.

In addition, this disclosure provides the ability to define external or user-defined optimization targets for specified process variables and plot these optimization targets for the selected variables on a radar chart to form an optimum pattern or shape. The current values of the same process variables can also be plotted to form a current value pattern or shape on the radar chart. If the superimposed patterns or shapes of the current values and optimization targets do not overlap or match very well, it can attract an operator's attention to review process variables that are deviating from the optimization targets and then perform drilldown to understand probable causes of the deviations from these targets. In a similar manner, the steady-state values of the process variables could be linked to form a pattern or shape. This could help the operator in understanding if a controller/optimizer may eventually "eclipse" the ideal optimum pattern or shape even if the current value pattern or shape is partially overlapping. This could also help the operator identify which variables (if any) might continue to deviate from the optimum pattern or shape in the future.

Figure 1:
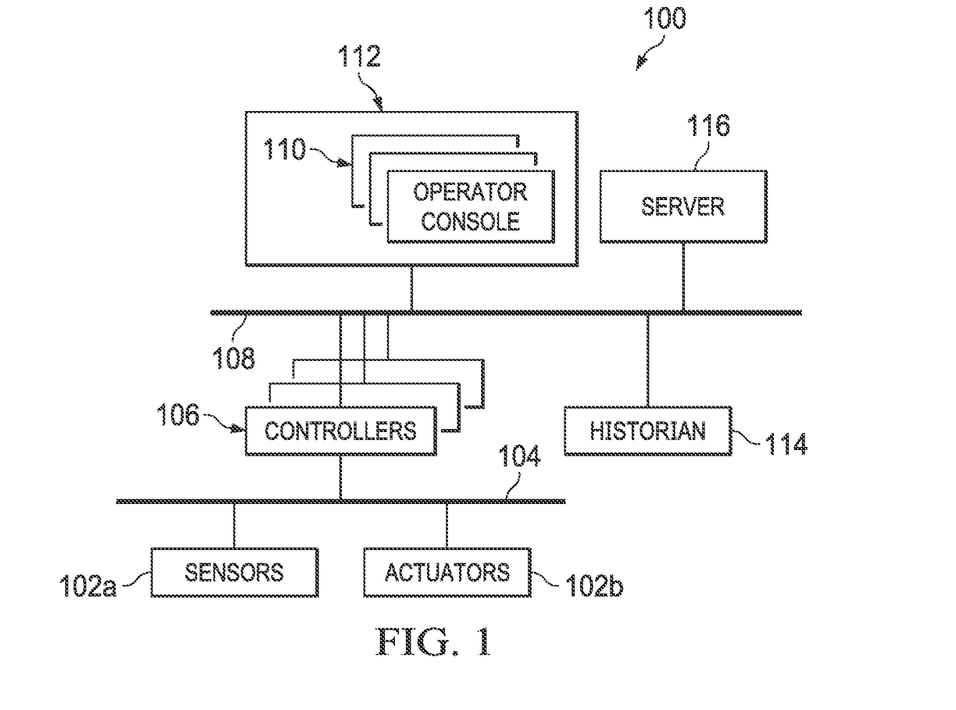
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings or pump speeds. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

At least one of the controllers 106 shown in FIG. 1 implements model-based control or other advanced process control (APC) and uses one or more process models. For example, each of these controllers 106 could operate using one or more process models to determine, based on measurements from one or more sensors 102a, how to adjust one or more actuators 102b. In some embodiments, each model associates one or more manipulated or disturbance variables (often referred to as independent variables) with one or more controlled variables (often referred to as dependent variables). A controlled variable (CV) generally represents a variable that can be measured or inferred and that is ideally controlled to be at or near a desired setpoint or within a desired range of values. A manipulated variable (MV) generally represents a variable that can be adjusted in order to alter one or more controlled variables. A disturbance variable (DV) generally denotes a variable whose value can be considered but cannot be controlled. As a simple example, a flow rate of material through a pipe could denote a controlled variable, a valve opening for a valve that controls the flow rate of material could denote a manipulated variable, and an ambient temperature around the pipe or the valve could denote a disturbance variable. The process models used by each of these controllers 106 could involve any suitable number of process variables, such as tens, hundreds, or thousands of process variables as noted above. Each of these controllers 106 could also include an optimizer, which uses an objective function to identify how to adjust its manipulated variables in order to push its controlled variables to the most attractive set of constraints.

At least one network 108 couples the controllers 106 and other devices in the system 100. The network 108 facilitates the transport of information between components. The network 108 could represent any suitable network or combination of networks and include associated switches, firewalls, and other components. As a particular example, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud or remote server communicatively coupled to the control and automation system 100.

As described in more detail below, one or more components in the system 100 could be used to generate radar charts and other smart visualizations based on process variable data associated with one or more industrial processes (or portions thereof). The visualizations could be generated using any suitable device(s) in the system 100, such as the operator consoles 110, server 116, or other components. The generated visualizations could also be presented to users using any suitable device(s) in the system 100, such as the operator consoles 110 or users' mobile devices. It should be noted that the device generating the radar charts may or may not be the same device presenting the radar charts to users.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, while FIG. 1 illustrates one example operational environment where smart visualizations used for industrial monitoring and control could be used, this functionality can be used in any other suitable system.

Figure 2:
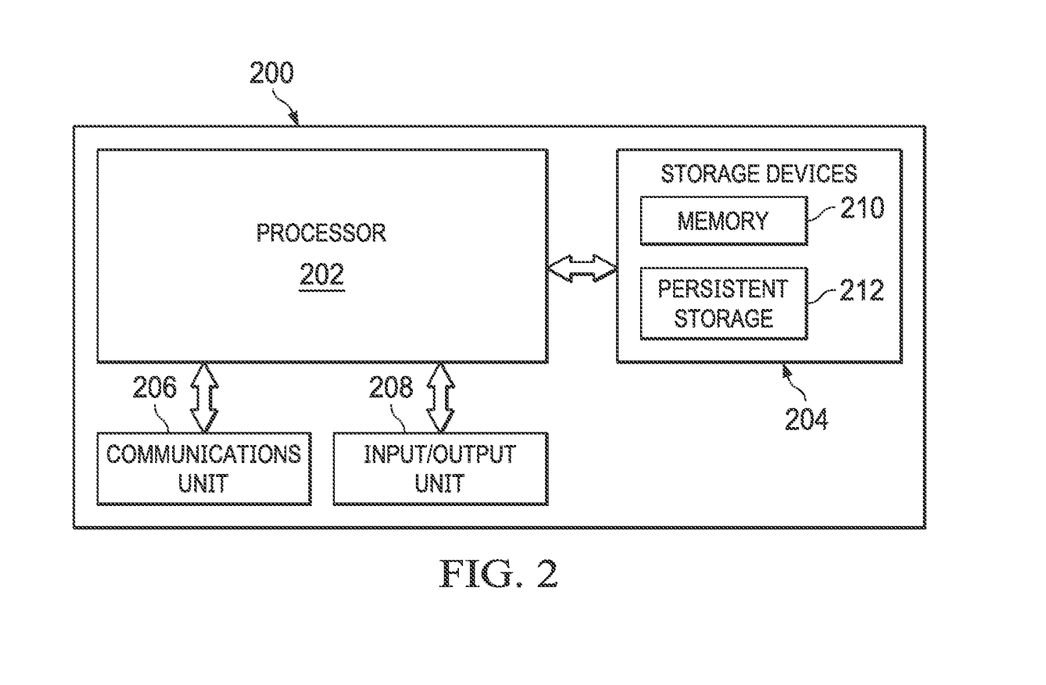
FIG. 2 illustrates an example device for generating or presenting smart visualizations for effective monitoring and control in an industrial process control and automation system according to this disclosure.

FIG. 2 illustrates an example device 200 for generating or presenting smart visualizations for effective monitoring and control in an industrial process control and automation system according to this disclosure. The device 200 could, for example, denote the operator consoles 110 or server 116 described above with respect to FIG. 1. However, the device 200 could be used in any other suitable system, and the device 200 need not represent an operator console or server in a system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could cause the processor 202 to generate or display one or more radar charts or other smart visualizations. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for generating or presenting smart visualizations for effective monitoring and control in an industrial process control and automation system, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
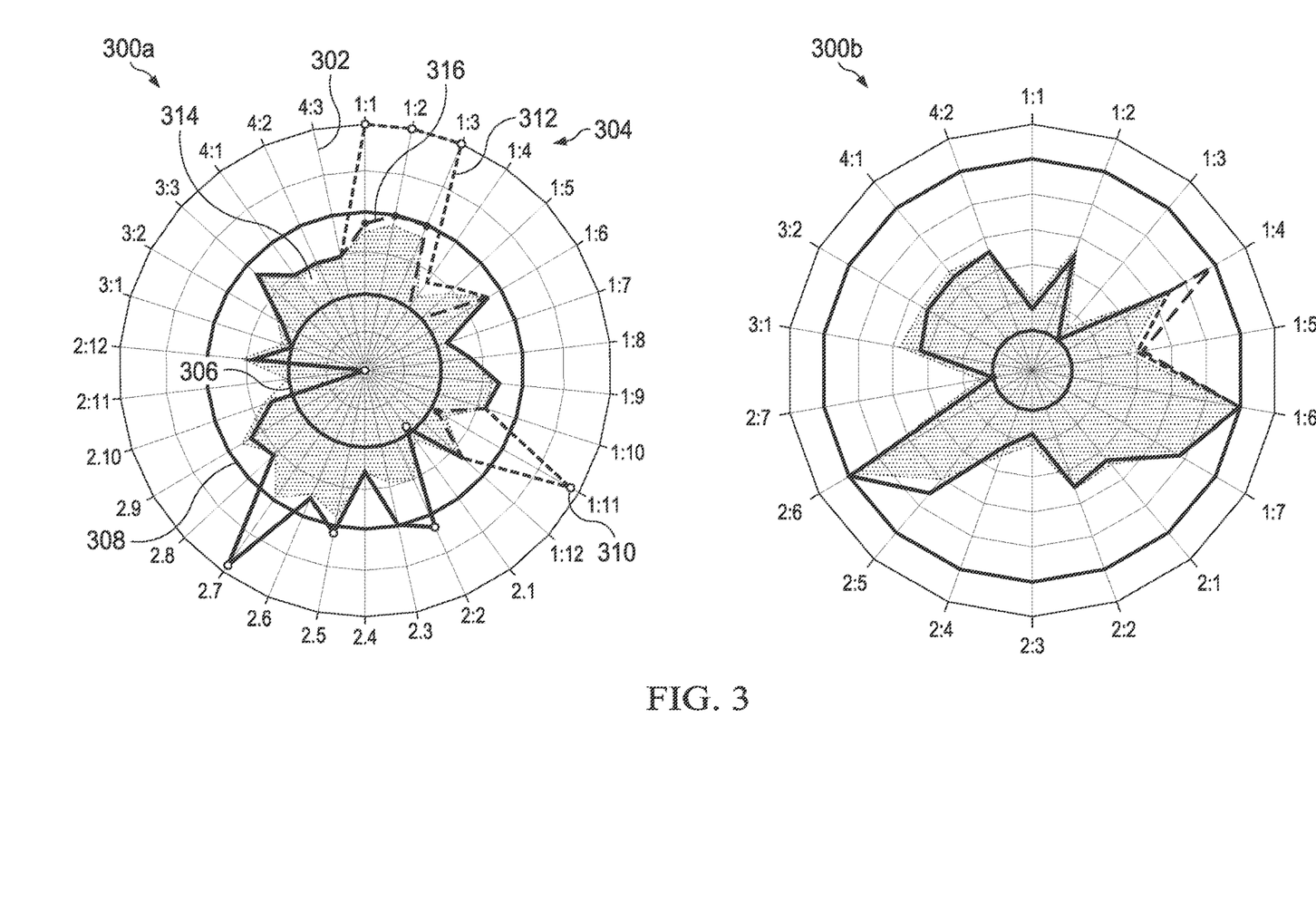
FIG. 3 illustrates a first example of radar charts forming a smart visualization for effective monitoring and control in an industrial process control and automation system according to this disclosure.

FIG. 3 illustrates a first example of radar charts 300a-300b forming a smart visualization for effective monitoring and control in an industrial process control and automation system according to this disclosure. For ease of explanation, the radar charts 300a-300b may be described as being generated or displayed by the device 200 of FIG. 2 in the system 100 of FIG. 1. However, the radar charts 300a-300b could be generated or displayed using any other suitable device(s) in any suitable system.

As shown in FIG. 3, each radar chart 300a-300b includes multiple radial grid lines 302, and each grid line 302 has an associated label 304. The grid lines 302 extend from a center of the radar chart 300a or 300b. Different grid lines 302 are associated with different process variables, which could be identified by the labels 304. In this example, the grid lines 302 are positioned at a fixed interval around a center point of each radar chart 300a or 300b, although this need not be the case.

The number of grid lines 302 and the process variables associated with the grid lines 302 could be defined in any suitable manner. For example, the number of grid lines 302 and the process variables associated with the grid lines 302 could be configured by a user, such as a user who will be viewing the radar chart 300a or 300b on an operator console 110 or a control engineer or other personnel designing the radar chart 300a or 300b for use by other users. In some embodiments, the process variables associated with the grid lines 302 of a radar chart can represent all of the process variables associated with a specific process controller or optimizer. In other embodiments, the process variables associated with a controller or optimizer could be subdivided into smaller logical groupings, and the process variables associated with the grid lines 302 of a radar chart could represent the process variables in one or more selected logical groups.

Each radar chart 300a-300b also includes two graphical indicators in the form of rings 306 and 308, which respectively define the low and high limits or constraints placed on the associated process variables in the radar chart. When the current value of a process variable is located between its low and high limits, the current value of the process variable is generally viewed as being acceptable. Thus, the area between the rings 306 and 308 in a radar chart denotes the area where all process variable values are ideally located. Process variables having current values outside their high and low limits are generally referred to as deviating variables. Note that the term "ring" here does not require the use of a circular indicator and that any suitable graphical indicators could be used to identify the high and low limits for the process variables along the radial lines 302. Other example forms could include elliptical shapes or polygons (where the number of sides of each polygon is defined by the number of radial lines 302).

Other graphical indicators used in the radar charts 300a-300b include one or more points 310, which can optionally be displayed along one or more of the grid lines 302. Each point 310 on a grid line 302 identifies a parameter value of the process variable associated with that grid line 302. The points 310 could be used to identify a single type of parameter value (such as a current value or steady-state value) of one or more process variables or multiple types of parameter values (such as both a current value and a steady-state value) of one or more process variables. Also, color, shading, or other features could be used to distinguish between the different types of parameter values. For example, a point 310 with a red color or first shading pattern could be used to identify the current value of a process variable, and a point 310 with a blue color or second shading pattern could be used to identify the steady-state value of the process variable. The steady-state value of a process variable could be calculated in any suitable manner, such as by an APC controller/optimizer.

In this example, the points 310 are only displayed for process variables having current values that fall outside of their high and low limits. In other words, the points 310 are only displayed in this example for deviating variables having current values that are inside the ring 306 (and therefore below their low limits) or outside the ring 308 (and therefore above their high limits). Note, however, that points 310 could be displayed for other subsets of process variables or for all process variables. Also note that, in some cases in FIG. 3, only one point 310 is displayed for some of the process variables that are outside their limits. This may occur when the current value and the steady-state value of a process variable are both outside of the process variable's limits and are equal.

Additional graphical indicators used in the radar charts 300a-300b include lines 312, which can be used to join the locations along the grid lines 302 where the current values of the process variables are located. The collection of lines 312 therefore defines a pattern or shape for the current values of the process variables. A shaded, watermarked, or other area 314 can be formed within a boundary defined by external or user-defined optimization targets for at least some of the process variables. This area 314 represents an optimum pattern or shape for the values of the process variables. As noted above, a user can view the patterns or shapes formed by the lines 312 and the area 314 in order to quickly identify if the current values and optimization targets match or are close. If not, it can attract the user's attention to review process variables that are deviating from the optimization targets (as defined by the points 310 with a red color or first shading pattern) and then perform other tasks to investigate and resolve the deviations.

Additional lines 316 can optionally be used to join the locations along the grid lines 302 where the steady-state values of the process variables are located. This collection of lines 316 therefore defines a pattern or shape for the steady-state values of the process variables. In some cases shown in FIG. 3, the lines 312 and 316 overlap, but there are various instances where the lines 312 and 316 diverge. The steady-state values of the process variables denote the values that the process variables are likely to settle at after some amount of time. Thus, even though the current value of a process variable may be above its high limit or below its low limit, the steady-state value of the process variable may indicate that the process variable is likely to settle within its limits and therefore not need much if any investigation. In contrast, even though the current value of a process variable may be between its high and low limits, the steady-state value of the process variable may indicate that the process variable is likely to settle outside its limits and may need investigation.

Since the lines 312 and 316 could overlap in a radar chart, different colors, line patterns, or other indicators could be used to distinguish between the lines 312 and 316. For example, the lines 312 could have a first color or line pattern when not overlapping, the lines 316 could have a second color or line pattern when not overlapping, and the lines 312 and 316 could have a third color or line pattern when overlapping. As a particular example, the lines 312 could be yellow when not overlapping, the lines 316 could be blue when not overlapping, and overlapping lines 312 and 316 could be green.

As can be seen in FIG. 3, multiple radar charts 300a-300b can be placed side-by-side, such as in a graphical display presented on the screen of an operator console 110 or other device. In this example, the chart 300a may relate to controlled variables, and the chart 300b may relate to manipulated variables associated with those controlled variables. In general, an industrial process is typically associated with a large number of process variables. A controlled variable (CV) generally represents a variable that can be measured or inferred and that is ideally controlled to be at or near a desired setpoint or within a desired range of values. A manipulated variable (MV) generally represents a variable that can be adjusted in order to alter one or more controlled variables. A disturbance variable (DV) generally denotes a variable whose value can be considered but cannot be controlled. As a simple example, a flow rate of material through a pipe could denote a controlled variable, a valve opening for a valve that controls the flow rate of material could denote a manipulated variable, and an ambient temperature around the pipe or the valve could denote a disturbance variable.

By presenting both radar charts 300a-300b together, a user may be able to more easily identify the cause of a process variable deviation. For example, if a user hovers over a particular process variable in one of the radar charts 300a-300b (such as by using a mouse), variables having a high impact gain relationship with that particular process variable can be highlighted in the other radar chart 300a-300b. Among other things, this could allow a user to quickly identify the manipulated variables in the radar chart 300b having a high impact gain relationship on a deviating controlled variable in the radar chart 300a. Note, however, that a single radar chart or any other suitable combination of radar charts could be presented to a user, and those radar charts may or may not be linked.

Because process variable values do not typically have the same scale or range of values, normalization can be performed to map the process variables' parameters to the space used within a radar chart. Thus, for example, the process variables' parameters can be scaled so that their low limits can be identified using a circular ring and so that their high limits can be identified using another circular ring. However, there is no requirement that the process variables' parameters be normalized in this specific manner. As long as the process variables' parameters can be presented for display, any suitable scaling or other normalization could occur. Moreover, in some cases, no scaling or other normalization may be needed.

If a user hovers over a particular process variable in a radar chart (such as by using a mouse), variables having a high impact gain relationship with that variable can be highlighted, either within the same radar chart or in a different radar chart. Also, if a user selects a particular process variable in a radar chart (such as by using a mouse), a trend chart associated with the particular process variable can be presented to the user. One example of a trend chart is shown in FIG. 4, which is described below.

Although FIG. 3 illustrates a first example of radar charts 300a-300b forming a smart visualization for effective monitoring and control in an industrial process control and automation system, various changes may be made to FIG. 3. For example, the contents and arrangements of the radar charts here are for illustration only. Other radar charts could easily be constructed using other process variable data.

Figure 4:
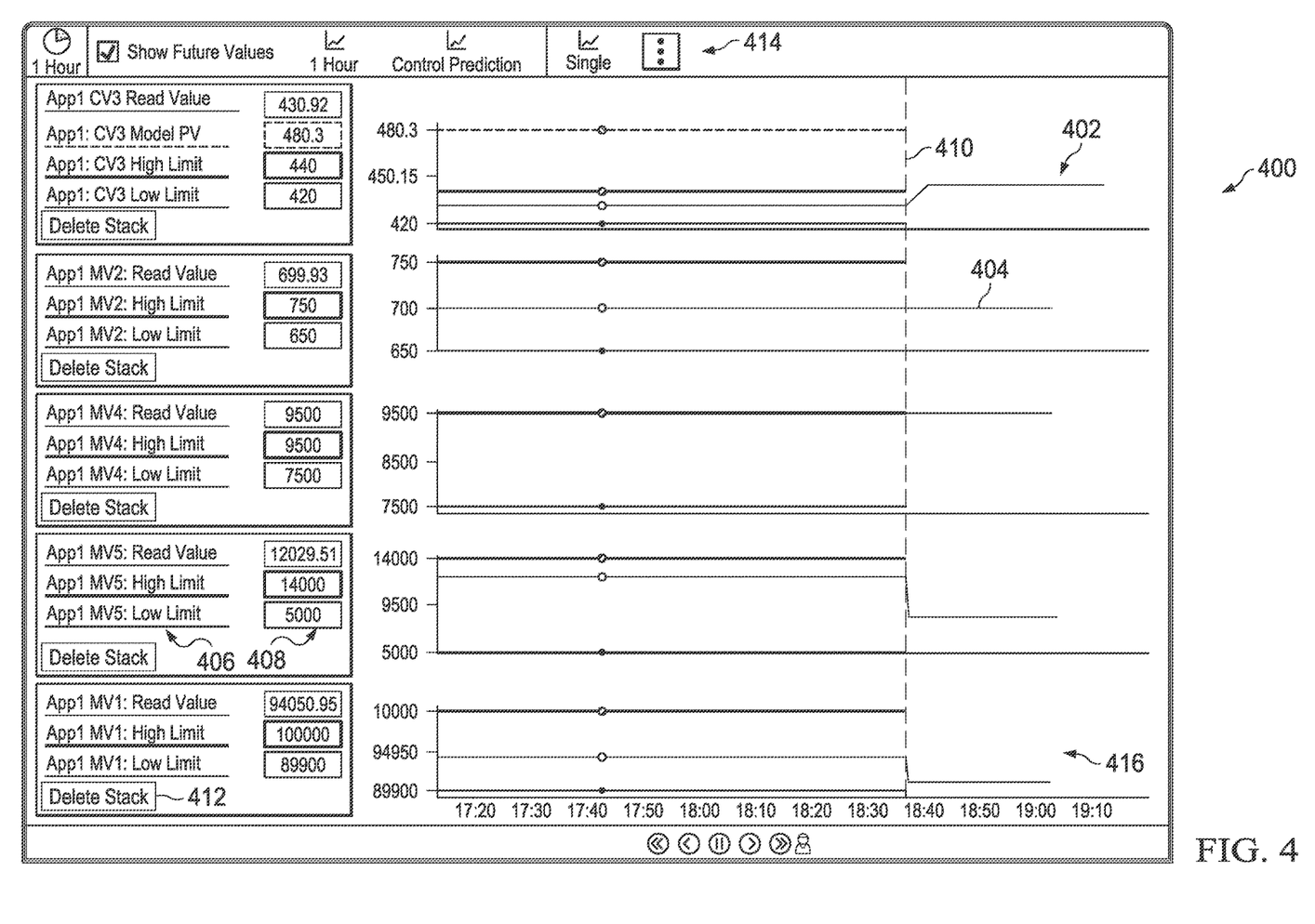
FIG. 4 illustrates an example trend chart accessible using a radar chart according to this disclosure.

FIG. 4 illustrates an example trend chart 400 accessible using a radar chart according to this disclosure. For ease of explanation, the trend chart 400 may be described as being generated or displayed by the device 200 of FIG. 2 in the system 100 of FIG. 1. However, the trend chart 400 could be generated or displayed using any other suitable device(s) in any suitable system.

As noted above, a user could click on or otherwise select a process variable in a radar chart, such as by selecting the label 304 of a process variable or a point 310 associated with a process variable in either radar chart 300a-300b described above. In response, a trend chart 400 for the selected process variable could be presented to the user, such as in a graphical display presented on the screen of an operator console 110 or other device.

As shown in FIG. 4, the trend chart 400 plots various values associated with multiple process variables over time. In particular, the trend chart 400 in this example includes multiple rows 402, which are associated with the selected process variable and one or more process variables having a high impact gain relationship with the selected process variable. There are various techniques known in the art for identifying process variables having the largest impact gain relationships with a selected process variable.

Each row 402 includes multiple lines 404, which plot various parameter values of the associated process variable over time. In this example, the lines 404 plot parameter values such as the process variables' high limits, low limits, and actual values over time. A legend 406 can be provided in each row 402 to identify the meanings associated with the different lines 404. Textual values 408 can also be provided in each row 402 to identify the current values of the process variables' parameters, and a marker 410 identifies within the trend chart 400 where the current time is (and thus where the current values of the process variables' parameters lie within the chart). Buttons 412 can be used to remove individual rows 402 from the trend chart 400.

Various controls 414 can be used here to control the types of information presented in the trend chart 400. For example, the controls 414 can be used to control the period of time for which data is presented in the trend chart 400. The controls 414 can also be used to control whether future predicted values and whether predictions involving control actions are shown in the trend chart 400. The controls 414 can further be used to control whether a single process variable or multiple process variables are shown in the trend chart 400. Of course, any other or additional controls could be used here as needed or desired.

The trends of the process variables are stacked here, meaning the rows 402 are placed one on top of the other. This allows the values of the various process variables to be plotted over a common time axis 416 (the horizontal axis in this example). A user could view the trends of the different process variables to determine, for example, what might be the cause of a process variable having a current value or steady-state value that is outside of its limits. Individual process variables can be removed from the stack by the user as desired, such as by using the buttons 412.

Although FIG. 4 illustrates one example of a trend chart 400 accessible using a radar chart, various changes may be made to FIG. 4. For example, the content and arrangement of the trend chart 400 here are for illustration only. Other trend charts could easily be constructed using other process variable data.

Figure 5:
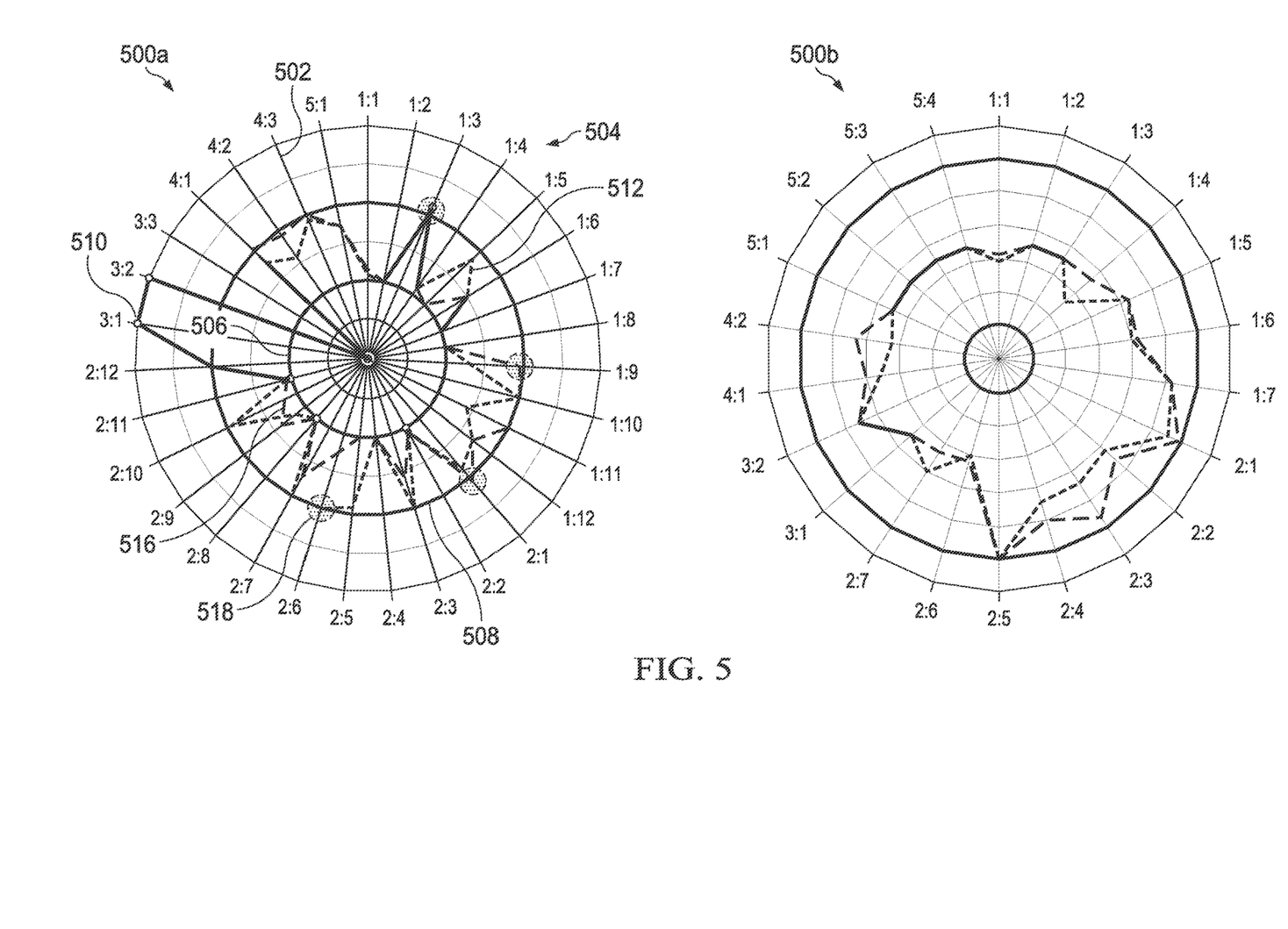
FIG. 5 illustrates a second example of radar charts forming a smart visualization for effective monitoring and control in an industrial process control and automation system according to this disclosure.

FIG. 5 illustrates a second example of radar charts 500a-500b forming a smart visualization for effective monitoring and control in an industrial process control and automation system according to this disclosure. For ease of explanation, the radar charts 500a-500b may be described as being generated or displayed by the device 200 of FIG. 2 in the system 100 of FIG. 1. However, the radar charts 500a-500b could be generated or displayed using any other suitable device(s) in any suitable system.

As shown in FIG. 5, each radar chart 500a-500b has many of the same features as the radar charts 300a-300b described above. For example, each radar chart 500a-500b includes multiple radial grid lines 502, and each grid line 502 has an associated label 504. Each radar chart 500a-500b also includes two graphical indicators in the form of rings 506 and 508, which respectively define the low and high limits placed on the associated process variables in the radar chart. One or more points 510 can optionally be displayed along one or more of the grid lines 502 to identify one or more parameter values (such as current and steady-state values) of the associated process variable(s). Lines 512 can be used to join the locations along the grid lines 502 where the current values of the process variables are located, and lines 516 can be used to join the locations along the grid lines 502 where the steady-state values of the process variables are located. Although not shown here, a shaded, watermarked, or other area (similar to the area 314 in FIG. 3A) can be formed within a boundary defined by external or user-defined optimization targets for at least some of the process variables. A selection of one of the process variables in a radar chart 500a-500b can cause a trend chart to be presented to a user.

At least one of the radar charts 500a-500b also includes one or more graphical markers 518. As noted above, it is often desirable to push certain process variables as close as possible to their high or low limits and keep those process variables there for the maximum time possible. For example, it may be desirable to keep process variables associated with raw material or energy usage at or near their low limits (without violating those low limits). As another example, it may be desirable to keep process variables associated with product throughput at or near their high limits (without violating those high limits). Each graphical marker 518 could identify locations in at least one of the radar charts 500a-500b where these desirable limits are located. Typically, each graphical marker 518 would be located around an intersection point between one of the radial lines 502 and one of the rings 506 or 508.

This allows for easier identification of more efficient or profitable operations of equipment and for easier identification of deviations from those operations. In this example, four graphical markers 518 are shown for the process variables associated with the grid lines labeled 1:3, 1:9, 2:1, and 2:6. A user could view the radar chart 500a and quickly see that the steady-state values for the process variables associated with the grid lines labeled 1:3, 1:9, and 2:1 are likely to settle at or near their high limits defined by the outer ring 508. However, for the process variable associated with the grid line 2:6, while the current value of the process variable is near its high limit defined by the outer ring 508, its steady-state value indicates that the process variable is likely to settle at a value away from its high limit. Thus, the graphical markers 518 can help to direct the user to identify any process variable that is currently at or is likely to settle away from a desirable limit. Note that while not shown here, one or more graphical markers 518 could be positioned on the ring 506 and identify where it is desirable to push certain process variables to their lower limits.

It is possible for any number of the process variables associated with any number of the grid lines 502 to have a graphical marker 518 identifying a desirable limit. In some embodiments, only a subset of the process variables associated with a radar chart may have graphical markers 518 identifying desirable limits for that subset of process variables (a subset could include a single process variable or multiple process variables). In other embodiments, all of the process variables associated with a radar chart may have graphical markers 518 identifying desirable limits for those process variables. If graphical markers 518 are used with only a subset of the process variables, the subset of process variables could be identified in any suitable manner, such as by an operator who views the radar chart or by a control engineer or other personnel who designs the radar chart.

Once again, by presenting both radar charts 500a-500b together, a user may be able to more easily identify the cause of a process variable deviation. For example, a user could hover over a particular process variable in one of the radar charts 500a-500b, and process variables having a high impact gain relationship with that particular process variable can be highlighted in the other radar chart 500a-500b. However, a single radar chart or any other suitable combination of radar charts could be presented to a user, and those radar charts may or may not be linked.

Although FIG. 5 illustrates a second example of radar charts 300a-300b forming a smart visualization for effective monitoring and control in an industrial process control and automation system, various changes may be made to FIG. 5. For example, the contents and arrangements of the radar charts here are for illustration only. Other radar charts could easily be constructed using other process variable data.

Figure 6:
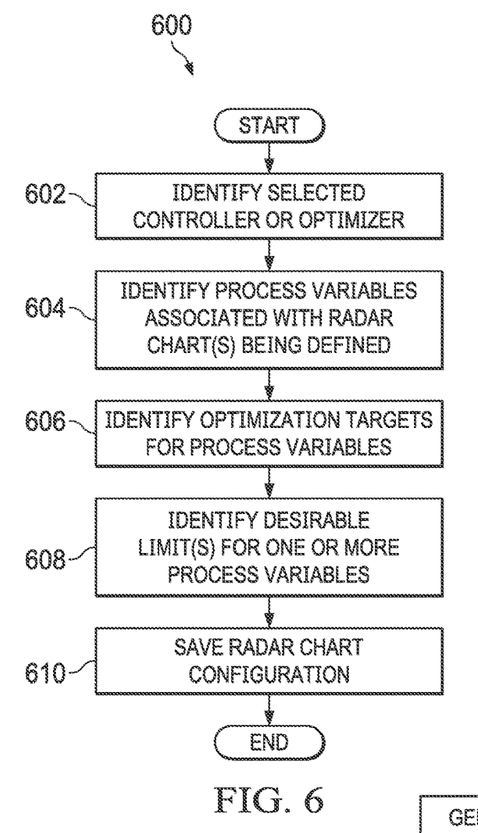
FIG. 6 illustrates an example method for configuring a smart visualization for effective monitoring and control in industrial process control and automation systems according to this disclosure.

FIG. 6 illustrates an example method 600 for configuring a smart visualization for effective monitoring and control in industrial process control and automation systems according to this disclosure. For ease of explanation, the method 600 is described as being performed by the device 200 of FIG. 2 in the system 100 of FIG. 1. However, the method 600 could be used with any other suitable device(s) in any suitable system.

As shown in FIG. 6, a selected controller or optimizer associated with an industrial process is identified at step 602. This could include, for example, the processor 202 of the device 200 allowing a user to navigate through a tree or other hierarchy showing equipment associated with the industrial process and to select a specific controller or optimizer. Of course, the controller or optimizer could be selected in any other suitable manner.

Process variables to be associated with at least one radar chart being defined are identified at step 604. This could include, for example, the processor 202 of the device 200 presenting the user with a list of process variables for the identified controller or optimizer. This could also include the processor 202 of the device 200 receiving an identification of the specific process variables from the list to be included in the radar chart(s) being designed. If multiple radar charts are being designed, this could further include the processor 202 of the device 200 associating different selected process variables with different radar charts, such as by associating controlled variables with one radar chart and related manipulated variables with another radar chart.

Optimization targets for the selected process variables are identified at step 606. This could include, for example, the processor 202 of the device 200 obtaining the optimization targets from a control engineer, operator, or other user or from an external destination (such as a higher-level optimizer). One or more desirable limits for one or more of the process variables may be identified at step 608. This could include, for example, the processor 202 of the device 200 obtaining an identification of any high or low limits where it may be desirable to push the associated process variables against those limits. This could also include the processor 202 of the device 200 obtaining the identification of the desirable limits from a control engineer, operator, or other user or from an external destination (such as a higher-level optimizer).

A radar chart configuration containing this information is saved at step 610. This could include, for example, the processor 202 of the device 200 storing a configuration file defining the radar chart(s) in association with the selected controller or optimizer. The radar chart configuration can identify the process variables, optimization targets, and any desired limits to be included in or identified by the defined radar chart(s). Note that the configuration can be saved in any suitable format and that the saved configuration could be stored for usage on the same device creating the configuration or on one or more different devices.

Although FIG. 6 illustrates one example of a method 600 for configuring a smart visualization for effective monitoring and control in industrial process control and automation systems, various changes may be made to FIG. 6. For example, while shown as a series of steps, various steps in FIG. 6 could overlap, occur in parallel, occur in a different order, or occur any number of times. As a particular example, the method 600 (or a part thereof) could be repeated multiple times to define multiple radar charts for the same controller/optimizer or for different controllers/optimizers. Also, configurations for radar charts could be defined in any other suitable manner.

In particular embodiments, the method 600 can be implemented as part of a web-based APC monitoring software package, such as the PROFIT SUITE WEB VIEWER (PSWeb) from HONEYWELL INTERNATIONAL INC. In these embodiments, a user could define optimization targets for certain process variables in an APC controller/optimizer. An application such as PSWeb can provide a workflow to build a view (termed "My View") where the user can add process variables that the user is interested in monitoring. Thus, the user could select an APC controller/optimizer for which to configure a "My View," and the user can build a "My View" list of specified process variables for that controller/optimizer. The "My View" list can then be saved for later use. The user could create multiple "My View" lists, either for the same controller/optimizer or for different controllers/optimizers. Note, however, that configuration may be optional and that a user could view a radar chart with all variables plotted, with predefined variables plotted, or with variables selected in other ways plotted.

Figure 7:
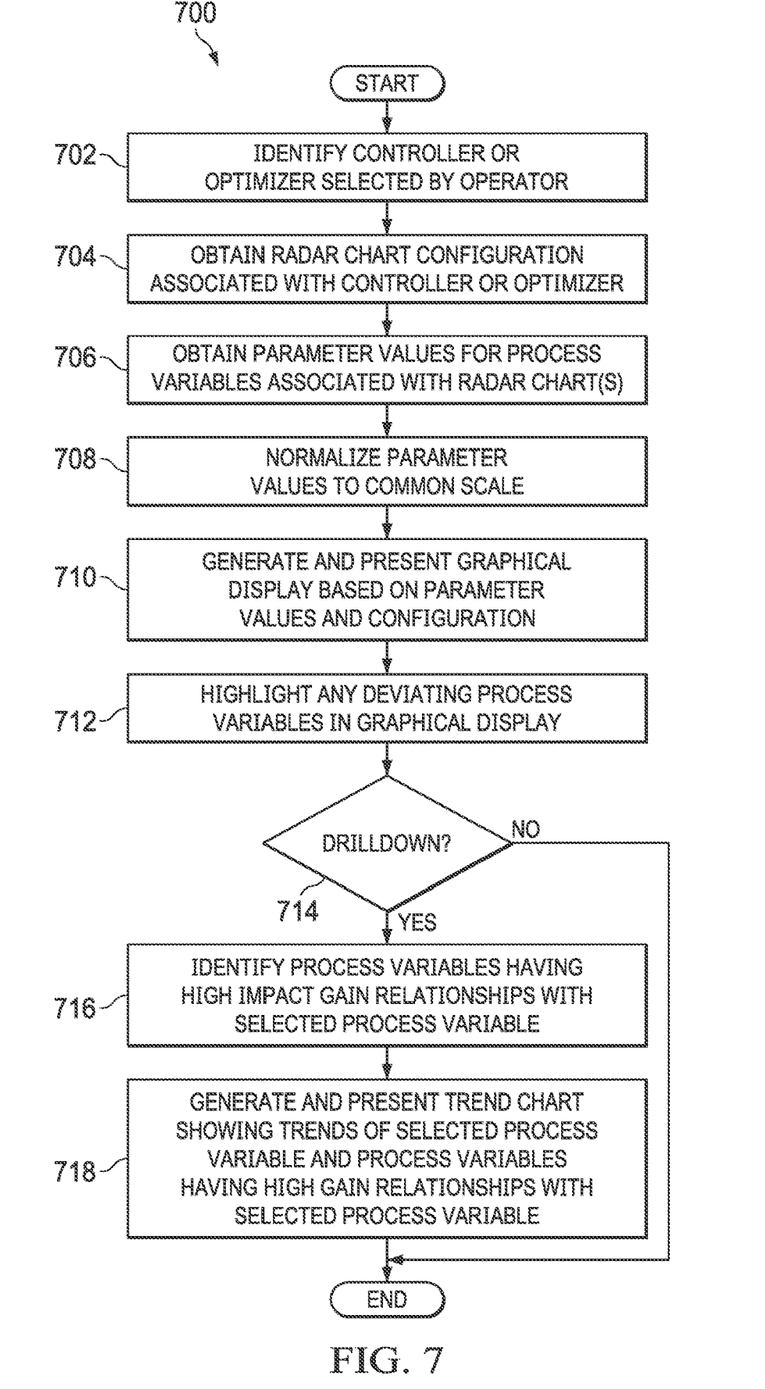
FIG. 7 illustrates an example method for generating and presenting a smart visualization for effective monitoring and control in industrial process control and automation systems according to this disclosure.

FIG. 7 illustrates an example method 700 for generating and presenting a smart visualization for effective monitoring and control in industrial process control and automation systems according to this disclosure. For ease of explanation, the method 700 is described as being performed by the device 200 of FIG. 2 in the system 100 of FIG. 1. However, the method 700 could be used with any other suitable device(s) in any suitable system.

As shown in FIG. 7, a controller or optimizer selected by an operator is identified at step 702. This could include, for example, the processor 202 of the device 200 allowing a user to navigate through a tree or other hierarchy showing equipment associated with an industrial process and selecting a controller or optimizer. Of course, the controller or optimizer could be selected in any other suitable manner. A radar chart configuration associated with the controller or optimizer is obtained at step 704. This could include, for example, the processor 202 of the device 200 obtaining at least one file or other data structure that identifies one or more radar charts associated with the selected controller or optimizer.

Parameter values for process variables associated with the radar chart(s) to be generated are obtained at step 706. This could include, for example, the processor 202 of the device 200 obtaining current and steady-state values and high and low limits for the controlled and manipulated variables associated with the radar chart(s). This data could be obtained from any suitable source(s), such as a controller 106 or historian 114. The parameter values could be normalized to a common scale at step 708. This could include, for example, the processor 202 of the device 200 scaling the process variables' parameters so that their low limits are equal distance from a center of a radar chart and so that their high limits are equal distance from the center of the radar chart.

A graphical display is generated based on the parameter values and the configuration and presented at step 710. This could include, for example, the processor 202 of the device 200 generating one or more radar charts showing the low and high limits of the process variables and the current values of the process variables. The radar chart(s) could also include the steady-state values of the process variables and the optimization targets of the process variables. The current values could be connected, the steady-state values could be connected, and the optimization targets could be connected to define various shapes or patterns. Any deviating process variables can be highlighted in the graphical display at step 712. This could include, for example, the processor 202 of the device 200 inserting points 310, 510 into the radar chart(s) identifying current and steady-state values for any deviating process variable outside its limits.

A determination is made whether the user requests a drilldown of a specific process variable at step 714. This could include, for example, the processor 202 of the device 200 determining whether the user has selected a specific label 304, 504 or point 310, 510 in a presented radar chart. If so, any process variables having a high impact gain relationship with the selected process variable are identified at step 716. This could include, for example, the processor 202 of the device 200 identifying the process variables whose changes have the largest impacts on the selected process variable. A trend chart showing trends in the selected process variable and the process variables having a high impact gain relationship with the selected process variable is generated and presented at step 718. This could include, for example, the processor 202 of the device 200 generating a stacked trend chart plotting the process variables' parameters over time.

Although FIG. 7 illustrates one example of a method 700 for generating and presenting a smart visualization for effective monitoring and control in industrial process control and automation systems, various changes may be made to FIG. 7. For example, while shown as a series of steps, various steps in FIG. 7 could overlap, occur in parallel, occur in a different order, or occur any number of times. As a particular example, the method 700 (or a part thereof) could be repeated multiple times to generate and display multiple radar charts for different logical groupings of process variables associated with the same controller or optimizer. Also, radar charts could be used in any other suitable manner, and drilldown need not be supported.

Figure 8:
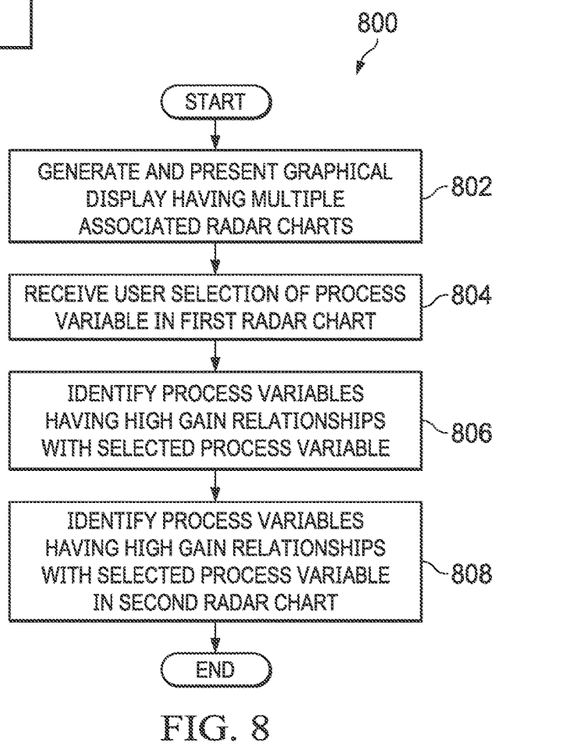
FIG. 8 illustrates an example method for using multiple linked smart visualizations for effective monitoring and control in industrial process control and automation systems according to this disclosure.

FIG. 8 illustrates an example method 800 for using multiple linked smart visualizations for effective monitoring and control in industrial process control and automation systems according to this disclosure. For ease of explanation, the method 800 is described as being performed by the device 200 of FIG. 2 in the system 100 of FIG. 1. However, the method 800 could be used with any other suitable device(s) in any suitable system.

As shown in FIG. 8, a graphical display containing multiple radar charts is generated and presented at step 802. This could include, for example, the processor 202 of the device 200 following the same general process shown in FIG. 7 to generate multiple radar charts. The radar charts contain process variables that are related in some way, such as controlled variables and manipulated variables that can be adjusted to alter the controlled variables.

A user's selection of one of the process variables in a first of the radar charts is received at step 804. This could include, for example, the processor 202 of the device 200 determining that the user has hovered over a specific label 304, 504 or point 310, 510 in the first radar chart. Any process variables having a high impact gain relationship with the selected process variable are identified at step 806. This could include, for example, the processor 202 of the device 200 identifying the process variables whose changes have the largest impacts on the selected process variable. The identified process variables having a high impact gain relationship with the selected process variable are identified in the second radar chart at step 808. This could include, for example, the processor 202 of the device 200 identifying the process variables in the second radar chart that most significantly affect the process variable selected in the first radar chart. The process variables in the second radar chart could be highlighted, labeled using bold letters, or identified in any other suitable manner.

Although FIG. 8 illustrates one example of a method 800 for using multiple linked smart visualizations for effective monitoring and control in industrial process control and automation systems, various changes may be made to FIG. 8. For example, while shown as a series of steps, various steps in FIG. 8 could overlap, occur in parallel, occur in a different order, or occur any number of times. Also, multiple related radar charts could be used in any other suitable manner.

In particular embodiments, the methods 700 and 800 can be implemented as part of a web-based APC monitoring software package, such as the PSWeb software package. In these embodiments, a user could select an APC controller/optimizer in order to monitor its status. An application such as PSWeb displays one or more radar charts, such as CV and MV radar charts, for the "My view" list(s) defined for that controller/optimizer. The radar charts can have the forms described above. Deviating variables can be highlighted, and the user can view the deviating variables and perform drilldown, such as by clicking on a highlighted point to load a trend chart. The trend chart can identify the highlighted variable's key parameters and parameters of process variables that have a high impact gain relationship with the selected variable. From this view, the user can analyze possible causes of a deviation for the "surfaced" issue. Moreover, the user can use the patterns or shapes of the current values and optimization targets of the process variables to identify any deviations, and the user can click on a deviating variable in the radar chart to perform drilldown using a trend chart. When hovering over a particular variable in the CV or MV radar chart, variables having a high impact gain relationship with that variable can be highlighted in the other radar chart, which could indicate to the user whether a deviation is due to some constraint issue In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    obtaining parameter values for multiple process variables associated with an industrial process, the parameter values for each process variable comprising low and high limits and a current value; and
    presenting a first graphical display, wherein the first graphical display is associated with multiple controlled variables of the process variables of the industrial process, the first graphical display comprising:
        radial lines each associated with a different one of the multiple controlled variables;
        a first graphical indicator passing through the radial lines and identifying the low limits of the multiple controlled variables;
        a second graphical indicator passing through the radial lines and identifying the high limits of the multiple controlled variables; and
        third graphical indicators identifying the current values of the multiple controlled variables along the radial lines;
    presenting a second graphical display, the second graphical display associated with multiple manipulated variables of the process variables of the industrial process;
    selecting by a user one of the multiple controlled variables in the first graphical display; and
    identifying in the second graphical display one or more of the manipulated variables that have a higher impact on the selected one of the multiple controlled variables when manipulated than at least some of the other manipulated variables.

2. The method of claim 1, wherein:
    the first graphical indicator comprises a first visible ring passing through the radial lines and identifying the low limits of the multiple controlled variables;
    the second graphical indicator comprises a second visible ring passing through the radial lines and identifying the high limits of the multiple controlled variables; and
    the third graphical indicators comprise points or lines identifying the current values of the multiple controlled variables.

3. The method of claim 2, wherein the first graphical display comprises:
    at least one point for each controlled variable whose current value falls outside the controlled variable's low and high limits; and
    multiple lines joining the current values of the multiple controlled variables.

4. The method of claim 2, wherein the first graphical display comprises:
    multiple lines joining the current values of the multiple controlled variables to create a first shape or pattern; and
    an area identifying optimization targets of the multiple controlled variables and having a second shape or pattern.

5. The method of claim 2, wherein the first graphical display comprises:
multiple lines joining the current values of the multiple controlled variables to create a first shape or pattern; and
multiple lines joining steady-state values of the multiple controlled variables to create a second shape or pattern that at least partially overlaps the first shape or pattern.

6. The method of claim 1, wherein:
The first graphical display comprises one or more graphical markers positioned along one or more of the radial lines; and
each graphical marker indicates that the high or low limit along the associated radial line is a limit against which the associated controlled variable should be pushed.

7. An apparatus comprising:
at least one processing device configured to:
obtain parameter values for multiple process variables associated with at least one industrial process, the parameter values for each process variable comprising low and high limits and a current value; and
generate a graphical display comprising:
radial lines each associated with a different one of the process variables;
a first graphical indicator passing through the radial lines and identifying the low limits of the process variables, wherein the first graphical indicator comprises a first visible ring passing through the radial lines and identifying the low limits of the process variables;
a second graphical indicator passing through the radial lines and identifying the high limits of the process variables, wherein the second graphical indicator comprises a second visible ring passing through the radial lines and identifying the high limits of the process variables; and
third graphical indicators identifying the current values of the process variables along the radial lines, wherein the third graphical indicators comprise points or lines identifying the current values of the process variables.

8. The apparatus of claim 7, wherein the graphical display comprises:
at least one point for each process variable whose current value falls outside the process variable's low and high limits; and
multiple lines joining the current values of the process variables.

9. The apparatus of claim 7, wherein the graphical display comprises:
multiple lines joining the current values of the process variables to create a first shape or pattern; and
an area identifying optimization targets of the process variables and having a second shape or pattern.

10. The apparatus of claim 7, wherein the graphical display comprises:
multiple lines joining the current values of the process variables to create a first shape or pattern; and
multiple lines joining steady-state values of the process variables to create a second shape or pattern that at least partially overlaps the first shape or pattern.

11. The apparatus of claim 7, wherein:
the graphical display comprises one or more graphical markers positioned along one or more of the radial lines; and
each graphical marker indicates that the high or low limit along the associated radial line is a limit against which the associated process variable should be pushed.

12. The apparatus of claim 7, wherein the at least one processing device is further configured to:
receive a selection of one of the process variables in the graphical display; and
present a second graphical display comprising (i) one or more plots of one or more parameters for the selected process variable and (ii) one or more plots of one or more parameters for at least one process variable having a higher impact on the selected process variable when changed than at least some of the other process variables.

13. The apparatus of claim 7, wherein:
the graphical display includes a first and a second graphical displays, wherein the first graphical display is associated with multiple controlled variables of the process variables of the industrial process, and the second graphical display is associated with multiple manipulated variables of the process variables of the industrial process, wherein when a user selects one of the multiple controlled variables in the first graphical display, the at least one processing device identifies in the second graphical display one or more of the manipulated variables that have a higher impact on the selected one of the multiple controlled variables when manipulated than at least some of the other manipulated variables.

14. The apparatus of claim 7, wherein:
the graphical display comprises a first graphical display associated with a first subset of process variables used by a controller or optimizer; and
the at least one processing device is further configured to present a second graphical display associated with a second subset of process variables used by the controller or optimizer.

15. A non-transitory computer readable medium containing instructions that when executed cause at least one processing device to:
obtain parameter values for multiple process variables associated with an industrial process, the parameter values for each process variable comprising low and high limits and a current value; and
generate a first graphical display, wherein the first graphical display is associated with multiple controlled variables of the process variables of the industrial process, the first graphical display comprising:
radial lines each associated with a different one of the multiple controlled variables;
a first graphical indicator passing through the radial lines and identifying the low limits of the multiple controlled variables;
a second graphical indicator passing through the radial lines and identifying the high limits of the multiple controlled variables; and
third graphical indicators identifying the current values of the multiple controlled variables along the radial lines;
generate a second graphical display, the second graphical display associated with multiple manipulated variables of the process variables of the industrial process;
receive a selection, from a user, of one of the multiple controlled variables displayed in the first graphical display; and
identify in the second graphical display one or more of the manipulated variables that have a higher impact on the selected one of the multiple controlled variables when manipulated than at least some of the other manipulated variables.

16. The non-transitory computer readable medium of claim 15, wherein the first graphical display comprises:
at least one point for each controlled variable whose current value falls outside the controlled variable's low and high limits;
multiple lines joining the current values of the multiple controlled variables to create a first shape or pattern; and
multiple lines joining steady-state values of the multiple controlled variables to create a second shape or pattern that at least partially overlaps the first shape or pattern.

17. The non-transitory computer readable medium of claim 15, wherein:
The first graphical display comprises one or more graphical markers positioned along one or more of the radial lines; and
each graphical marker indicates that the high or low limit along the associated radial line is a limit against which the associated controlled variable should be pushed.

\* \* \* \* \*